US007937055B2

(12) United States Patent
Schroeder et al.

(10) Patent No.: US 7,937,055 B2
(45) Date of Patent: May 3, 2011

(54) TIMESHIFTING FOR A MULTIPLE-TUNER VEHICLE RADIO SYSTEM

(75) Inventors: Jamison C. Schroeder, Birmingham, MI (US); David E. Bojanwski, Clarkston, MI (US); Walter J. Holloway, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 699 days.

(21) Appl. No.: 11/949,155

(22) Filed: Dec. 3, 2007

(65) Prior Publication Data

US 2009/0141596 A1 Jun. 4, 2009

(51) Int. Cl.
*H04B 1/18* (2006.01)
*H04K 3/00* (2006.01)

(52) U.S. Cl. .................................. 455/191.1; 455/167.1

(58) Field of Classification Search ............... 455/161.1, 455/161.2, 167.1, 168.1, 178.1, 185.1, 186.1, 455/191.1, 199.1

See application file for complete search history.

(56) References Cited

U.S. PATENT DOCUMENTS

2002/0002499 A1* 1/2002 Furuya ............................ 705/26
2005/0020223 A1* 1/2005 Ellis et al. .................. 455/186.1
2006/0140098 A1* 6/2006 Champion et al. ......... 369/59.21

* cited by examiner

*Primary Examiner* — Lee Nguyen

(74) *Attorney, Agent, or Firm* — Ingrassia Fisher & Lorenz, P.C.

(57) ABSTRACT

Methods and apparatus are provided for timeshifting audio content in a multiple tuner audio system comprising a first tuner and a second tuner. One operating method involves maintaining a first data storage element for the first tuner, maintaining a second data storage element for the second tuner, receiving first audio content in realtime by the first tuner, and storing data representing the first audio content in the first data storage element, resulting in first stored content. The method also receives second audio content in realtime by the second tuner, and stores data representing the second audio content in the second data storage element, resulting in second stored content. The method thereafter generates a timeshifted audio signal corresponding to the first stored content or the second stored content.

6 Claims, 3 Drawing Sheets

TIMESHIFTING FOR A MULTIPLE-TUNER VEHICLE RADIO SYSTEM

TECHNICAL FIELD

The subject matter described herein generally relates to vehicle sound systems, and more particularly relates to time-shifting of received broadcast content using a multiple tuner system.

BACKGROUND

Onboard audio, radio, navigation, and video systems are very common in modern vehicles. Some onboard audio/visual systems are compatible with multiple sources, including conventional AM and FM radio signals, satellite radio signals, compact discs, DVDs, cassette tapes, digital audio formats, digital video formats, and the like.

The prior art includes an onboard vehicle system that is capable of recording and storing content that is received by a single radio tuner. The recorded content is stored in a digital format such that it can be played back at a later time (i.e., the content can be timeshifted). In such a system, the realtime audio content for a radio station is recorded simultaneously with the realtime generation of its audible signal within the passenger cabin of the vehicle. If the listener desires to hear timeshifted content, the tuner is switched from a realtime broadcasting mode to a timeshifted playback mode.

Timeshifting content received by only one radio tuner has limitations. For example, a single-tuner system cannot record one radio station in the background while playing realtime audio content of another radio station. Thus, a single-tuner system will not enable a listener to "channel surf" between two or more stations while timeshifting content on more than one station.

BRIEF SUMMARY

An audio system for a vehicle is provided. The audio system includes a first tuner configured to receive a first wireless signal that conveys first audio content, a second tuner configured to receive a second wireless signal that conveys second audio content, and a data storage architecture coupled to the first tuner and the second tuner. The data storage architecture is configured to store first data representing the first audio content while the second tuner is operating in an active mode, and to store second data representing the second audio content while the first tuner is operating in the active mode.

A method of timeshifting audio content in a multiple tuner audio system is provided. The method involves: generating a first realtime audio signal corresponding to first audio content received by a first tuner; switching from the first tuner to a second tuner; terminating the first realtime audio signal in response to the switching; generating a second realtime audio signal corresponding to second audio content received by the second tuner; and storing first data corresponding to post-switching audio content received by the first tuner, resulting in stored content.

Another method of timeshifting audio content in a multiple tuner audio system is provided, where the audio system includes a first tuner and a second tuner. The method involves: maintaining a first data storage element for the first tuner; maintaining a second data storage element for the second tuner; receiving first audio content in realtime by the first tuner; storing data representing the first audio content in the first data storage element, resulting in first stored content; receiving second audio content in realtime by the second tuner; storing data representing the second audio content in the second data storage element, resulting in second stored content; and thereafter generating a timeshifted audio signal corresponding to the first stored content or the second stored content.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment of the present invention will hereinafter be described in conjunction with the following drawing figures, wherein like numerals denote like elements.

DESCRIPTION OF AN EXEMPLARY EMBODIMENT

Figure 1:
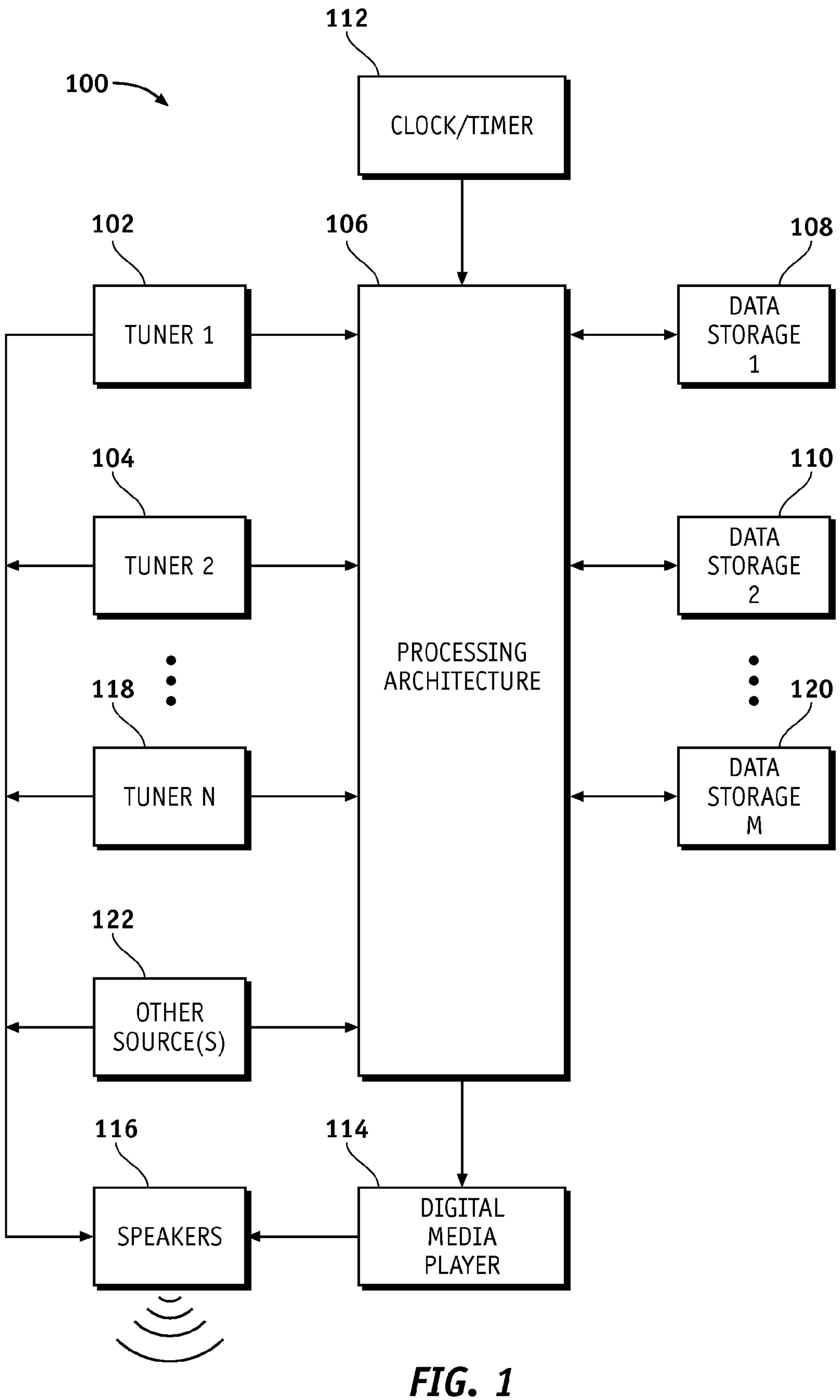
FIG. 1 is a schematic representation of an embodiment of an audio system for a vehicle.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of onboard vehicle audio, video, or entertainment systems, and that the system described herein is merely one suitable example.

For the sake of brevity, conventional techniques related to signal processing, data transmission, radio tuners, digital media formatting, storage, and playback, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the depicted subject matter.

The subject matter described herein relates to a multiple-tuner onboard audio/visual system that is configured to record and store content received in realtime, for timeshifted playback at a later time. The multiple tuners can independently receive a plurality of audio signals corresponding to different radio stations, channels, or content. While listening to one radio station (corresponding to a first tuner) in a live and realtime manner, content received by a second tuner can be stored for timeshifted playback. This system allows the user to record one radio station in the background while listening to another radio station. The system can also record one radio station in realtime while the user listens to that radio station, such that the user can timeshift the content on demand. With the multiple tuner technology described herein, two or more programs can be recorded and accessed later. For example, if the current radio station begins to play a commercial but the listener wants to hear the next song played after the commercial, he can record the current radio station in the background while listening to another radio station (which may be an AM, FM, or satellite station). After a period of time, the user can switch back to the original radio station and listen to the stored content or, if desired, the live realtime content.

FIG. 1 is a schematic representation of an embodiment of an audio system 100 for a vehicle. In practice, audio system 100 may be incorporated into any suitable entertainment, audio/visual, navigation, or other onboard system architecture. Moreover, an embodiment of audio system 100 will of course include many other elements (hardware, software, and/or firmware) that support a number of conventional features and functions that are unrelated or unimportant to the subject matter described herein.

The illustrated embodiment of audio system 100 includes, without limitation: a first tuner 102; a second tuner 104; a processing architecture 106; a first data storage element 108; a second data storage element 110; a clock/timer 112; a digital media player 114; and one or more speakers 116. FIG. 1 depicts a generalized embodiment of audio system 100 that contemplates any number of additional tuners 118 and any number of additional data storage elements 120. In certain embodiments, audio system 100 includes one or more other sources 122 of audio content. The various hardware, software, firmware, and logical components of audio system 100 are coupled together using an appropriate interconnection architecture or arrangement.

Audio system 100 may include a human-machine interface (HMI) and/or any number of user controls that enable a user to manipulate and control the operation of audio system 100. For example, the HMI can be designed to allow the user to select or "jump" between different audio sources, whether realtime or timeshifted. For example, the HMI may include a single Jump or Switch button realized as a hard key button, a softkey touchscreen button, or a single voice recognition command. Alternatively (or additionally), the HMI may include a direct audio source selection of the desired audio source, e.g., AM-Tuner1, AM-Tuner2, FM-Tuner1, FM-Tuner2, Satellite-Tuner1, Satellite-Tuner2, DAB, or the like.

Processing architecture 106 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof that is designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Processing architecture 106 may cooperate with a suitable amount of memory, which may be realized as RAM memory, flash memory, EPROM memory, EEPROM memory, registers, a hard disk, a removable disk, a CD-ROM, or any other form of storage medium known in the art. For this embodiment, the memory includes data storage elements 108/110/120. In this regard, such memory elements can be coupled to processing architecture 106 such that processing architecture 106 can read information from, and write information to, memory. In the alternative, one or more memory elements may be integral to processing architecture 106. As an example, processing architecture 106 and memory may reside in an ASIC.

In certain embodiments, data storage elements 108/110/120 form a data storage architecture for audio system 100. In practice, the data storage architecture can be realized using one or more physical components. For example, each data storage element 108/110/120 may represent a separate memory space defined in a single memory device supported by processing architecture 106. Alternatively, each data storage element 108/110/120 may represent a physically distinct memory device supported by processing architecture 106. Audio system 100 preferably utilizes a different data storage element for each tuner. In this regard, for the embodiment depicted in FIG. 1, data storage element 108 is devoted to first tuner 102, data storage element 110 is devoted to second tuner 104, and so on.

Each tuner in audio system 100 is suitably configured to receive a respective wireless signal that conveys audio content. Thus, first tuner 102 may be tuned such that it receives first audio content being broadcast by a first radio station, while second tuner 104 may be tuned such that it receives second audio content being broadcast by a second radio station. A tuner in audio system 100 may be, without limitation: an AM radio tuner; an FM radio tuner; a satellite radio tuner; a cellular-based media receiver; a digitally broadcast AM tuner; a digitally broadcast FM tuner; or a terrestrially based analog or digital tuner. Other sources 122 may include one or more other sources of audio content, which might be suitable for use with the timeshifting techniques described here. In this regard, other sources 122 may utilize existing receiver/tuner technologies and/or technologies developed in the future. Depending upon its implementation, a tuner 102/104/118 (or other source 122) may be configured to obtain digitally received content, digital audio content, audio content conveyed using a traditional modulation scheme, or the like. For example, traditional AM and FM radio tuners are analog-based, while satellite radio tuners are digital-based. The design and operation of AM radio tuners, FM radio tuners, and satellite radio tuners are well known, and such implementation details will not be described here.

Clock/timer 112 represents hardware, software, firmware, and/or processing logic that can be used to keep track of the amount of audio content stored in data storage elements 108/110/120. For the embodiment described here, each data storage element 108/110/120 is configured and controlled to store up to the most recent T minutes of audio content for its respective tuner. As one non-limiting example, first data storage element 108 can be regulated and controlled such that it stores a maximum of twenty minutes of audio content received by first tuner 102. Likewise, second data storage element 110 can be regulated and controlled such that it stores a maximum of twenty minutes of audio content received by second tuner 104. In practice, T can be selected to suit the needs of the given implementation. For instance, a relatively short length of time (such as twenty minutes) may be desirable to address copyright protection issues. If a given data storage element reaches the maximum storage capacity, then data representing incoming realtime audio content is saved and deleted on a first-in, first-out (FIFO) basis. A FIFO scheme ensures that the most recent audio content is preserved at the expense of the oldest audio content.

Audio system 100 may be configured to transform audio content received by tuners 102/104/118 and/or other sources 122 into respective digital audio files. In practice, audio system 100 may utilize processing architecture 106, digital media player 114, a digital signal processor, analog-to-digital converters, and other components to transform received audio content into suitably formatted data that represents digital audio files.

Digital media player 114 represents hardware, software, firmware, and/or processing logic that is suitably configured to process data stored in one or more of data storage elements 108/110/120 for playback as an audio signal. Digital media player 114 may be realized as a software application that plays digital media, digital audio, and/or digital media files such as, without limitation: MP3 files; AAC files; MP4 files; WMA files; OGG files; WAV files; AIFF files; AU files; or files created using GSM and/or other telephony related codecs. In preferred embodiments, digital audio files stored in data storage elements 108, 110, and 120 are compressed in accordance with one or more known compression schemes, e.g., MP3. However, the techniques and technologies described herein can also be applied to uncompressed file formats.

Speakers 116 are used to generate audio signals during timeshifted playback of recorded content and during realtime listening of received content. For the sake of clarity, FIG. 1 does not depict any amplifier elements that would be present in an embodiment of audio system 100. The operation of amplifiers and the manner in which speakers 116 are driven to generate audio signals are well known aspects of audio system 100. Such well known aspects will not be described in detail here.

In operation, processing architecture 106 of audio system 100 controls the storage (in first data storage element 108) of data that represents the audio content received by first tuner 102. In this embodiment, processing architecture 106 also controls the storage (in second data storage element 110) of data that represents the audio content received by second tuner 104. Depending upon the particular operating conditions and user preferences, the storage of audio content data in a given data storage element may occur while that tuner is operating in the active mode and/or the background mode. As used herein, a tuner 102/104/118 or other source 122 operates in the "active mode" when it serves as a realtime live audio source for audio system 100. For example, a conventional non-timeshifting FM radio tuner always plays in such an active mode. In preferred embodiments of audio system 100, only one tuner 102/104/118 or other source 122 can operate in the active mode at any time. As used herein, a given tuner 102/104/118 or other source 122 can operate in the "background mode" when another tuner or other source is operating in the active mode. In addition, a given tuner 102/104/118 or other source 122 can operate in the "background mode" when no other tuner or source is operating in the active mode. In other words, even if no audio signal is being generated by audio system 100, a tuners 102/104/118 or other source 122 might be operating in the background mode. In practice, more than one tuner 102/104/118 or other source 122 can operate in its respective background mode concurrently. Moreover, for broadcasts using digitally encoded audio, multiple audio channels/stations can be simultaneously timeshifted, and the HMI of audio system 100 can be used to select the desired timeshifted content.

Figure 3:
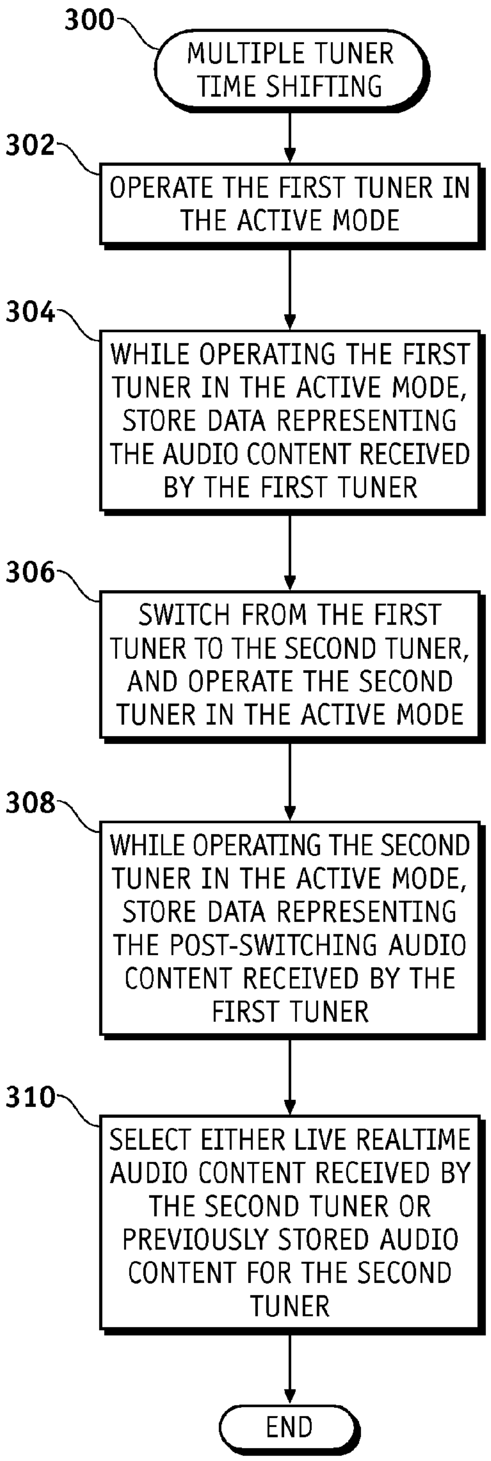
FIG. 3 is a flow diagram that illustrates another embodiment of a multiple tuner timeshifting process.
Figure 4:
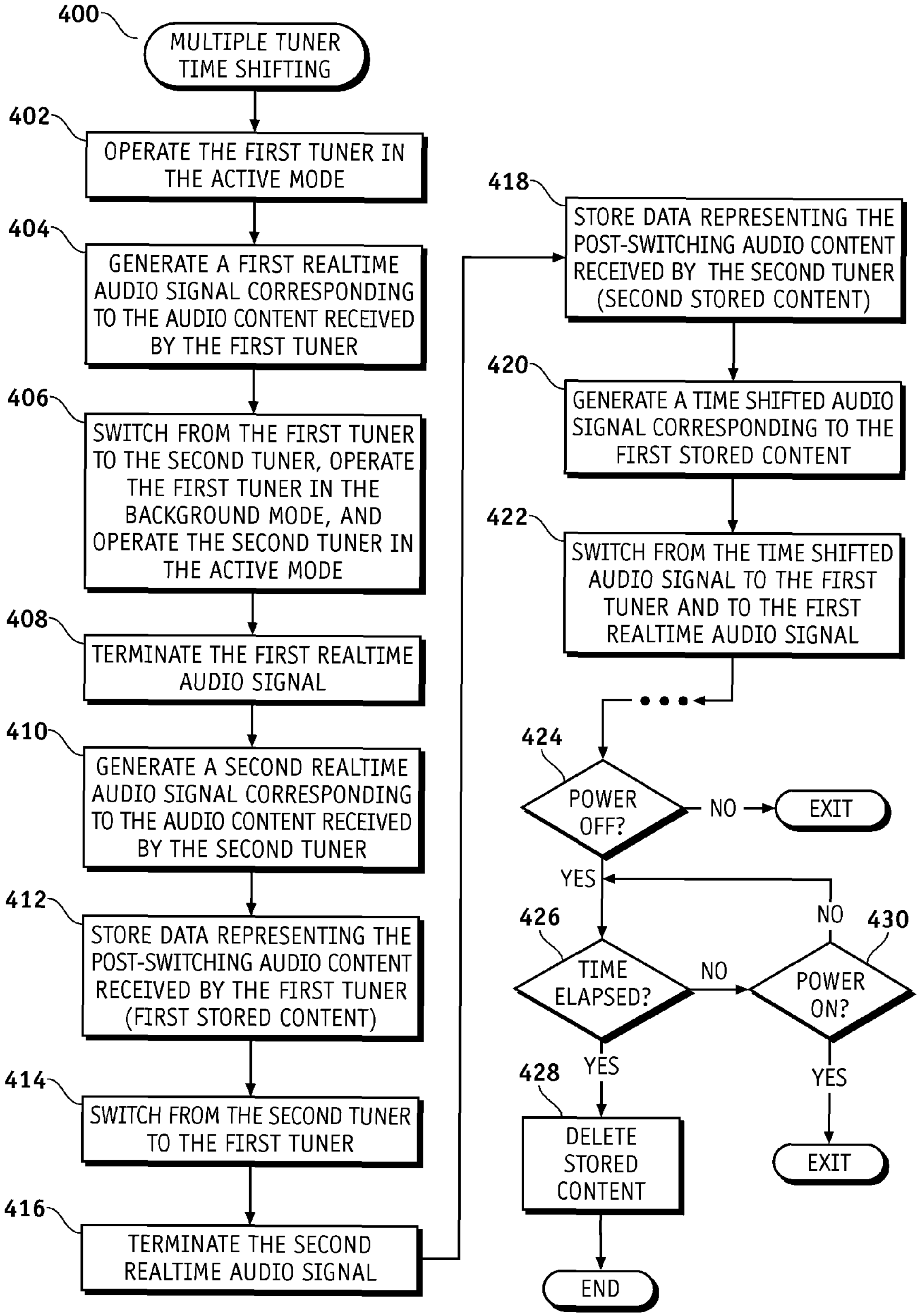
FIG. 4 is a flow diagram that illustrates yet another embodiment of a multiple tuner timeshifting process.

Certain operating features of audio system 100 will now be described with reference to FIGS. 2-4, which depict exemplary processes supported by various embodiments of audio system 100. It should be appreciated that audio system 100 can be suitably configured to perform many additional and/or alternative timeshifting processes and techniques, depending upon the particular implementation, user preferences, user control, and the like. The processes described here with reference to FIGS. 2-4 are not exhaustive of the different operating modes of audio system 100.

The various tasks performed in connection with any illustrated process may be performed by software, hardware, firmware, or any combination thereof. For illustrative purposes, the following description of the processes may refer to elements mentioned above in connection with FIG. 1. In practice, portions of a given process may be performed by different elements of the described system, e.g., a tuner 102/104/118, processing architecture 106, a data storage element 108/110/120; or digital media player 114. It should be appreciated that a given process may include any number of additional or alternative tasks, the tasks shown in FIGS. 2-4 need not be performed in the illustrated order, and a given process may be incorporated into a more comprehensive procedure or process having additional functionality not described in detail herein.

Figure 2:
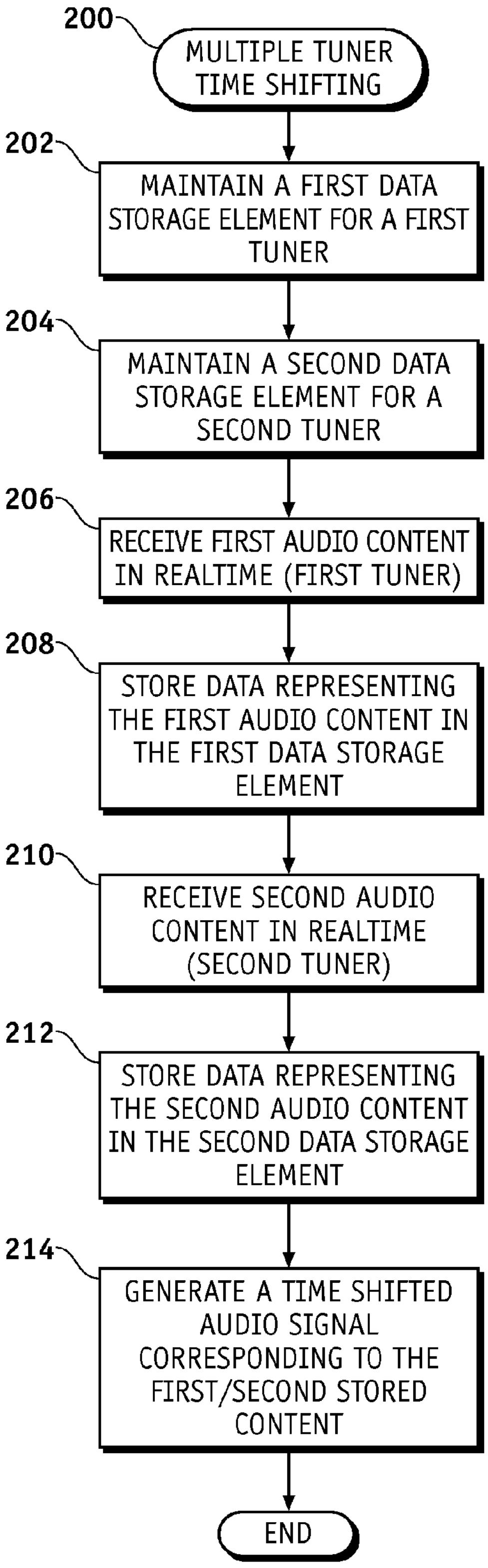
FIG. 2 is a flow diagram that illustrates an embodiment of a multiple tuner timeshifting process.

FIG. 2 is a flow diagram that illustrates an embodiment of a multiple tuner timeshifting process 200. Process 200 can be utilized to timeshift audio content in a multiple tuner audio system (such as audio system 100) having at least a first tuner and a second, independent tuner. Process 200 maintains a first data storage element for the first tuner (task 202), and maintains a second data storage element for the second tuner (task 204). The multiple data storage elements may be realized using one or a plurality of distinct memory devices. Alternatively, the multiple data storage elements may be realized using a single memory device that is logically partitioned into separate memory storage spaces corresponding to the respective data storage elements.

During operation of process 200, the first tuner can receive first audio content in realtime (task 206). Data representing this realtime first audio content can be stored (i.e., buffered) in the first data storage element, which is assigned to the first tuner (task 208). The data stored during task 208 is referred to herein as "first stored content." For the illustrated embodiment of process 200, the second tuner can receive second audio content in realtime (task 210). Data representing this realtime second audio content can be stored (i.e., buffered) in the second data storage element, which is assigned to the second tuner (task 212). The data stored during task 210 is referred to herein as "second stored content." After the audio content data is stored, process 200 generates one or more timeshifted audio signals corresponding to stored audio content (task 214). This timeshifted content may correspond to the first stored content (or any portion thereof) or to the second stored content (or any portion thereof).

In certain embodiments, timeshifted (and possibly realtime) content can be played simultaneously using specified speakers in the audio system. For example, timeshifted content from FM-Tuner1 can be played through the front speakers of a vehicle for a front seat passenger, while timeshifted content from Satellite-Tuner2 is played through a headphone jack for a rear seat passenger.

Audio content may be received while the respective tuner or source is operating in the active mode for the audio system and/or while the respective tuner or sourced is operating in a background mode for the audio system. For example, under one operating scenario, receiving the first audio content (task 206) and storing the first stored content (task 208) are performed while the first tuner is operating in the active mode for the audio system. In other words, the first audio content is concurrently buffered while the first tuner is being used as the live realtime tuner for the audio system. Under this operating scenario, receiving the second audio content (task 210) and storing the second stored content (task 212) are performed while the second tuner is operating in a background mode for the audio system. This methodology allows the audio system to record the second audio content in the background while the first tuner is active.

Under a second operating scenario, receiving the first audio content (task 206) and storing the first stored content (task 208) are performed while the first tuner is operating in a first background mode for the audio system. Under this second operating scenario, receiving the second audio content (task 210) and storing the second stored content (task 212) are performed while the second tuner is operating in a second background mode. This methodology allows the audio system to record audio content regardless of whether the given tuner is serving as the live realtime tuner. For instance, this technique enables the audio system to record realtime audio content received by one or more tuners while the audio system plays timeshifted audio content (recorded from any tuner/source in the audio system).

FIG. 3 is a flow diagram that illustrates another embodiment of a multiple tuner timeshifting process 300. Process 300 is performed during another operating scenario, where the user is switching between two (or more) live sources. For this particular scenario, the audio system initially operates the first tuner in the active mode (task 302). In other words, the first tuner serves as the live realtime broadcast source. While operating the first tuner in the active mode, process 300 stores data representing the audio content received by the first tuner, resulting in first stored content (task 304).

In response to an appropriate command, such as a user-entered command, process 300 switches from the first tuner to the second tuner (task 306), and operates the second tuner in the active mode. For this embodiment, task 306 also causes the first tuner to operate in its respective background mode. While operating the second tuner in the active mode, process 300 stores data representing the post-switching audio content received by the first tuner (task 308). In other words, the audio system continues to record the content received by the first tuner even after it has been switched from the active mode to the background mode.

For this particular embodiment, upon switching to the second tuner, the audio system enables the user to choose whether to listen to: live realtime audio content received by the second tuner; or previously stored audio content received by the second tuner (i.e., timeshifted content). In this regard, the audio system may default to live realtime audio content. In response to an appropriate command, such as a user-entered command, process 300 can select (for generation as an audible signal) an audio signal corresponding to the live realtime audio content received by the second tuner, or previously stored audio content for the second tuner (task 310).

FIG. 4 is a flow diagram that illustrates yet another embodiment of a multiple tuner timeshifting process 400. Process 400 may be performed during certain operating scenarios. Some features, functions, and aspects of process 400 were described in detail above with reference to process 200 and/or process 300. For the sake of brevity, such common features, functions, and aspects will not be redundantly described in detail in the context of process 400.

Process 400 may begin by operating the first tuner in the active mode for the audio system (task 402). While the first tuner is operating in the active mode, the audio system generates a first realtime audio signal corresponding to the audio content received by the first tuner (task 404). Tasks 402 and 404 represent a traditional and conventional aspect of the audio system, where operation of a tuner results in the concurrent generation of a respective audio signal. Process 400 contemplates the situation where the audio system switches from the first tuner to the second tuner (task 406). In response to such switching, the audio system operates the first tuner in its background mode, and operates the second tuner in the active mode. Moreover, process 400 terminates the first realtime audio signal in response to the switching (task 408). While the second tuner is operating in the active mode, the audio system generates a second realtime audio signal corresponding to the audio content received by the second tuner (task 410). Notably, process 400 also stores data representing the post-switching audio content received by the first tuner (task 412), resulting in first stored content. This feature enables the user to listen to live content from the second tuner while recording in the background the live content from the first tuner.

For this example, process 400 switches from the second tuner back to the first tuner some time after initiating storage of the first stored content (task 414). In response to this switching, process 400 terminates the second realtime audio signal (task 416), and stores data representing the post-switching audio content received by the second tuner (task 418), resulting in second stored content. In addition, process 400 generates a timeshifted audio signal corresponding to the first stored content (task 420). Task 420 may be automatically initiated upon switching, or it may be initiated at the request of the user. FIG. 4 also depicts the scenario where process 400 switches from the timeshifted audio signal to the realtime audio signal that is currently being received by the first tuner (task 422). Of course, an embodiment of process 400 might allow the user to switch back and forth between live audio content and timeshifted audio content (for any number of tuners/sources) upon demand. As mentioned above, the audio system may utilize an HMI and/or user controls that enable the user to switch back and forth between the various audio sources.

As mentioned above with reference to FIG. 1, a practical embodiment of the audio system may include certain features that prevent unlimited and/or permanent retention of stored audio content. For example, the audio system may be configured such that each tuner/source is assigned a predetermined amount of memory space (e.g., a T-minute buffer) for stored content. FIG. 4 depicts a power-off safeguard that might be implemented to ensure that stored content is not preserved across power on/off cycles (which typically correspond to ignition cycles for vehicle applications). In this regard, if process 400 detects a power off condition (query task 424), then it may initiate a timer to monitor an elapsed time since detecting the power off condition. If query task 424 does not detect a power off condition, then process 400 exits or is re-entered at an appropriate location.

Assuming that a power off condition has been detected, process 400 checks whether the elapsed time since power off exceeds a threshold period of time (query task 426). If so, then process 400 deletes the stored content (task 428). The threshold time may be selected to suit the particular application, to provide the necessary level of safeguarding, or in accordance with a user-entered configuration. For example, a threshold time of about twenty minutes might accommodate most situations where the user temporarily powers down the audio system, such as: filling the vehicle with gas; running a quick errand; or the like. This threshold time ensures that stored content remains accessible after powering down the system for a short time. Moreover, in certain embodiments the audio system continues to store realtime content in the background for the threshold period of time before actually powering down. However, after the elapsed time exceeds the threshold period of time, process 400 will delete all stored content. Thereafter, process 400 ends.

If the threshold period of time has not elapsed (query task 426), then process 400 may check to determine whether power has been turned back on (query task 430). If so, then process 400 exits or is re-entered at an appropriate location to continue operation as described above. If not, then process 400 is re-entered at query task 426 to continue monitoring the elapsed time.

Use Cases

As mentioned previously, an embodiment of the audio system described herein can be suitably configured to support a number of features, functions, and operating modes. The following is a brief description of different use cases and operating scenarios that might be supported by an embodiment of the audio system. These use cases are merely representative, and are not intended to limit or restrict any of the embodiments described herein.

1. AM/AM or FM/FM simultaneous timeshifting—The user will have the ability to listen in realtime or timeshift mode while a previously tuned AM station continues to buffer live content. Upon switching to the background station, the point of play will be live and the user will have the previous T minutes of specified timeshift buffer available for timeshifting. Upon switching to the background station, the previously tuned station will retain any timeshifted information prior to station change. Additionally, the pause point will continue to update as specified. Switching between station frequencies shall appear seamless to the user and switching will not affect the timeshifted audio content of either frequency source. The system can be equipped with a means of transitioning between the last sources, where the method of transitioning can be one button. The one button can be used to switch back and forth between the sources without violating any of the performance requirements.

2. AM/FM or FM/AM simultaneous timeshifting—The user will have the ability to listen in realtime or timeshift mode to an FM/AM station while a previously tuned AM/FM station continues to buffer live content. Upon switching to the background station, the point of play will be live and the user will have the previous T minutes of specified timeshift buffer available for timeshifting. Upon switching to the background station, the previously tuned station will retain any timeshifted information prior to station change. Switching between AM/FM bands shall appear seamless to the user and switching will not affect the timeshifted or buffered audio content of either AM/FM band source. The system shall be equipped with a means of transitioning between the last sources, where the method of transitioning can be one button. The one button can be used to switch back and forth between the sources without violating any of the performance requirements.

3. Satellite Radio Timeshifting/Record while AM/AM, FM/FM, or AM/FM simultaneous timeshifting—The user will have the ability to listen to satellite radio audio live, timeshifted, or recording while simultaneously buffering the previous two AM/AM, FM/FM, or AM/FM stations. All satellite radio timeshifting and recording requirements shall affect only the satellite radio audio content. The AM/AM, FM/FM, or AM/FM stations shall continue to buffer as indicated in the previous two sections. Upon switching to AM/AM, FM/FM, or AM/FM source, the previous station shall resume play at the live point and the user will have the previous T minutes of specified timeshift buffer available for timeshifting. Upon switching to AM/AM, FM/FM, or AM/FM source, the system shall be able to retain and recall the previous two AM/AM, FM/FM, or AM/FM sources. The buffered information shall be retained for user playback. Switching between satellite radio and AM/FM bands shall appear seamless to the user and switching will not affect the timeshifted of buffered audio content of either satellite radio or AM/FM band sources. The system can be equipped with a means of transitioning between the last sources, where the method of transitioning can be one button. The one button can be used to switch back and forth between the sources without violating any of the performance requirements. In the case where satellite radio and two additional sources are being buffered/recorded in one instance, the system shall the ability switch amongst all three sources with the one button implementation.

4. Digital HD AM/FM simultaneous timeshifting—The user will have the ability to listen in realtime or timeshift mode while a previous tuned AM/AM station or sideband station continues to buffer live content. The system shall be capable of buffering audio from the primary station and either of the sideband stations without the loss of signal, loss of audio quality and without violating performance requirements. The system shall be capable of buffering two sidebands of the primary station without the loss of signal, loss of audio quality and without violating performance requirements. The system shall be capable of buffering two sidebands of separate primary stations in either AM/AM, FM/FM, or AM/FM buffering configuration without the loss of signal, loss of audio quality, and without violating performance requirements. Upon switching to the background station(s), the point of play will be live and the user will have the previous T minutes of specified timeshift buffer available for timeshifting. Upon switching to the background station, the previously tuned station will retain any timeshifted information prior to station change. Additionally, the pause point will continue to update as specified. Switching between station and sideband frequencies shall appear seamless to the user and switching will not affect the timeshifted or buffered audio content of either frequency source. The system can be equipped with a means of transitioning between the last sources, where method of transitioning can be one button. The one button can be used to switch back and forth between the sources without violating any of the performance requirements.

5. Satellite radio Timeshifting/Record while Digital HD AM/FM simultaneous timeshifting—The user will have the ability to listen to satellite radio audio live, timeshifted, or recording while simultaneously buffering the previous two AM/AM, FM/FM, or AM/FM stations and/or station sidebands. All satellite radio timeshifting and recording requirements shall affect only the satellite radio audio content. The AM/AM, FM/FM, or AM/FM stations shall continue to buffer as indicated above. The system shall be capable of buffering audio from the primary station and either of the station sidebands without the loss of signal, loss of audio quality and without violating performance requirements. The system shall be capable of buffering two sidebands of primary station without the loss of signal, loss of audio quality and without violating performance requirements. The system shall be capable of buffering two sidebands of separate primary station in either AM/AM, FM/FM, or AM/FM buffering configuration without the loss of signal, loss of audio quality and without violating performance requirements. Upon switching to the background station(s), the point of play will be live and the user will have the previous T minutes of specified timeshift buffer available for timeshifting. Upon switching to the background station, the previously tuned station will retain any timeshifted information prior to station change. Additionally the pause point will continue to update as specified. Switching between station and sideband frequencies shall appear seamless to the user and switching will not affect the timeshifted or buffered audio content of either frequency source. The system can be equipped with a means of transitioning between the last sources, where the method of transitioning can be one button. The one button can be used to switch back and forth between the sources without violating any of the performance requirements. In the case where satellite radio and two additional sources are being buffered/recorded in one instance, the system shall the ability switch amongst all three sources with the one button implementation.

6. HDD Playback while Digital HD or Analog AM/AM, FM/FM, or AM/FM simultaneous timeshifting—The user shall have the ability to play content from the HDD while simultaneously buffering the previous two AM/AM, FM/FM, or AM/FM stations and/or station sidebands. HDD bandwidth throughput shall not have any negative affects on buffered audio signal and audio quality. The system shall be capable of buffering audio from the primary station and either of the stations sidebands without the loss of signal, loss of audio quality and without violating performance requirements. The system shall be capable of buffering two sidebands of primary station without the loss of signal, loss of audio quality and without violating performance requirements. The system shall be capable of buffering two sidebands of separate primary station in either AM/AM, FM/FM, or AM/FM buffering configuration without the loss of signal, loss of audio quality and without violating performance requirements. The system shall meet all of the performance requirements of the HDD, AM/FM tuners, and timeshifting specifications. The system shall be equipped with a means of transitioning between the HDD source and the buffered/recorded audio content, where the method of transitioning shall be at most two button presses. The one button, relative to audio only, shall be used to switch back and forth between the sources without violating any of the performance requirements. In the case where satellite radio and two additional sources are being buffered/recorded in one instance, the system shall the ability switch amongst all three sources with the one button implementation, relative to audio only.

7. Timeshifting Multiple Digital Channels—The system can be configured to timeshift a plurality of digitally broadcast channels/stations such that the user can select one source signal to review while the audio system timeshifts the complete set of channels/stations. As an example, the audio system generates realtime audio corresponding to one satellite radio station, while digitally receiving and storing content from multiple satellite radio stations in one data-stream packet (or in a single stream of packets).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of timeshifting audio content in a multiple tuner audio system, the method comprising:
- generating a first realtime audio signal corresponding to first audio content received by a first tuner;
- switching from the first tuner to a second tuner;
- terminating the first realtime audio signal in response to the switching;
- generating a second realtime audio signal corresponding to second audio content received by the second tuner;
- storing first data representing post-switching audio content received by the first tuner, resulting in stored content;
- after initiation of the storing step, switching from the second tuner to the first tuner;
- terminating the second realtime audio signal in response to switching from the second tuner to the first tuner; and
- generating, in response to switching from the second tuner to the first tuner, a timeshifted audio signal corresponding to the stored content.

2. The method of claim 1, further comprising switching from the timeshifted audio signal to the first realtime audio signal.

3. The method of claim 1, wherein storing the first data comprises storing up to the most recent T minutes of the post-switching audio content.

4. The method of claim 1, further comprising:
- detecting a power off condition; and
- deleting the stored content in response to the power off condition.

5. The method of claim 1, further comprising:
- detecting a power off condition;
- monitoring an elapsed time since detecting the power off condition; and
- deleting the stored content after the elapsed time exceeds a threshold period of time.

6. A method of timeshifting audio content in a multiple tuner audio system, the method comprising:
- generating a first realtime audio signal corresponding to first audio content received by a first tuner;
- switching from the first tuner to a second tuner;
- terminating the first realtime audio signal in response to the switching;
- generating a second realtime audio signal corresponding to second audio content received by the second tuner;
- storing first data representing post-switching audio content received by the first tuner, resulting in stored content;
- after generating the second realtime audio signal, switching from the second tuner to the first tuner;
- terminating the second realtime audio signal in response to switching from the second tuner to the first tuner; and
- storing second data representing post-switching audio content received by the second tuner, resulting in second stored content.

* * * * *